Aug. 11, 1936.  F. F. FORSHEE  2,050,303
COFFEE MAKER
Filed Feb. 21, 1934   3 Sheets-Sheet 1
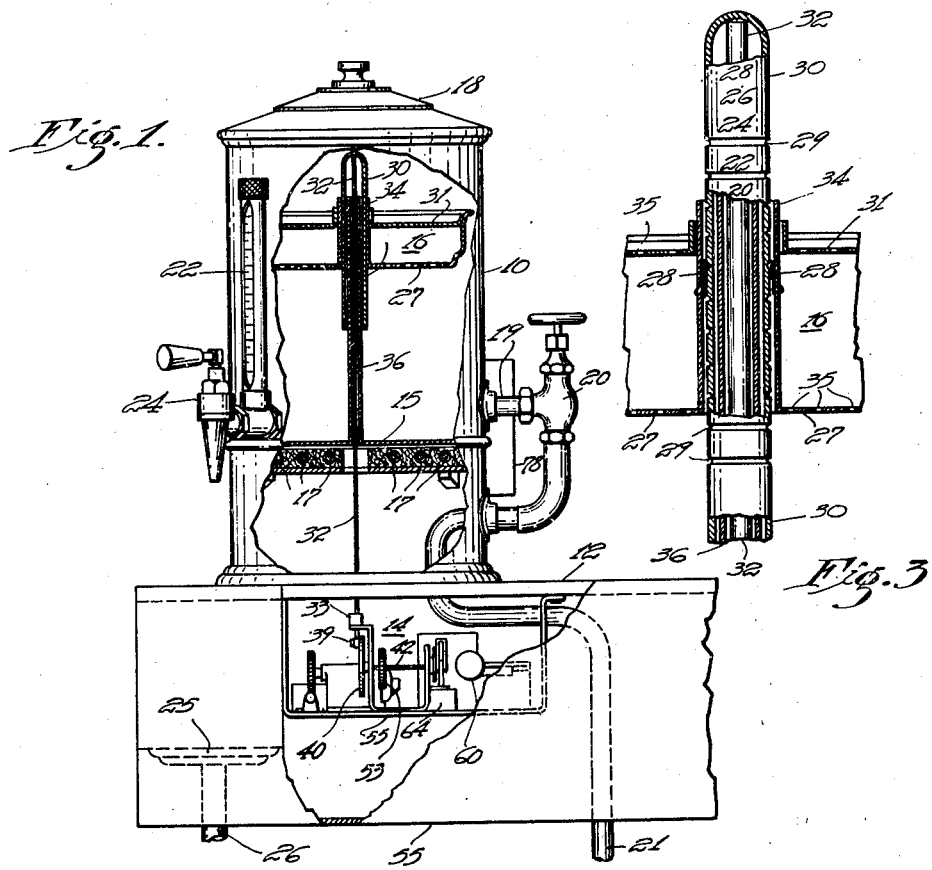
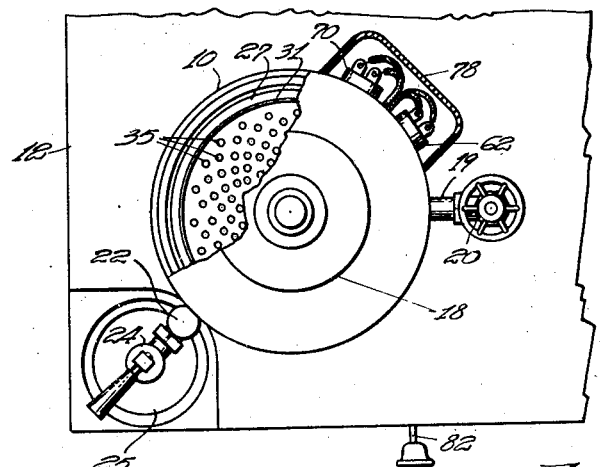

Aug. 11, 1936.  F. F. FORSHEE  2,050,303
COFFEE MAKER
Filed Feb. 21, 1934  3 Sheets-Sheet 2

WITNESSES:

INVENTOR
Frank F. Forshee
BY
ATTORNEY

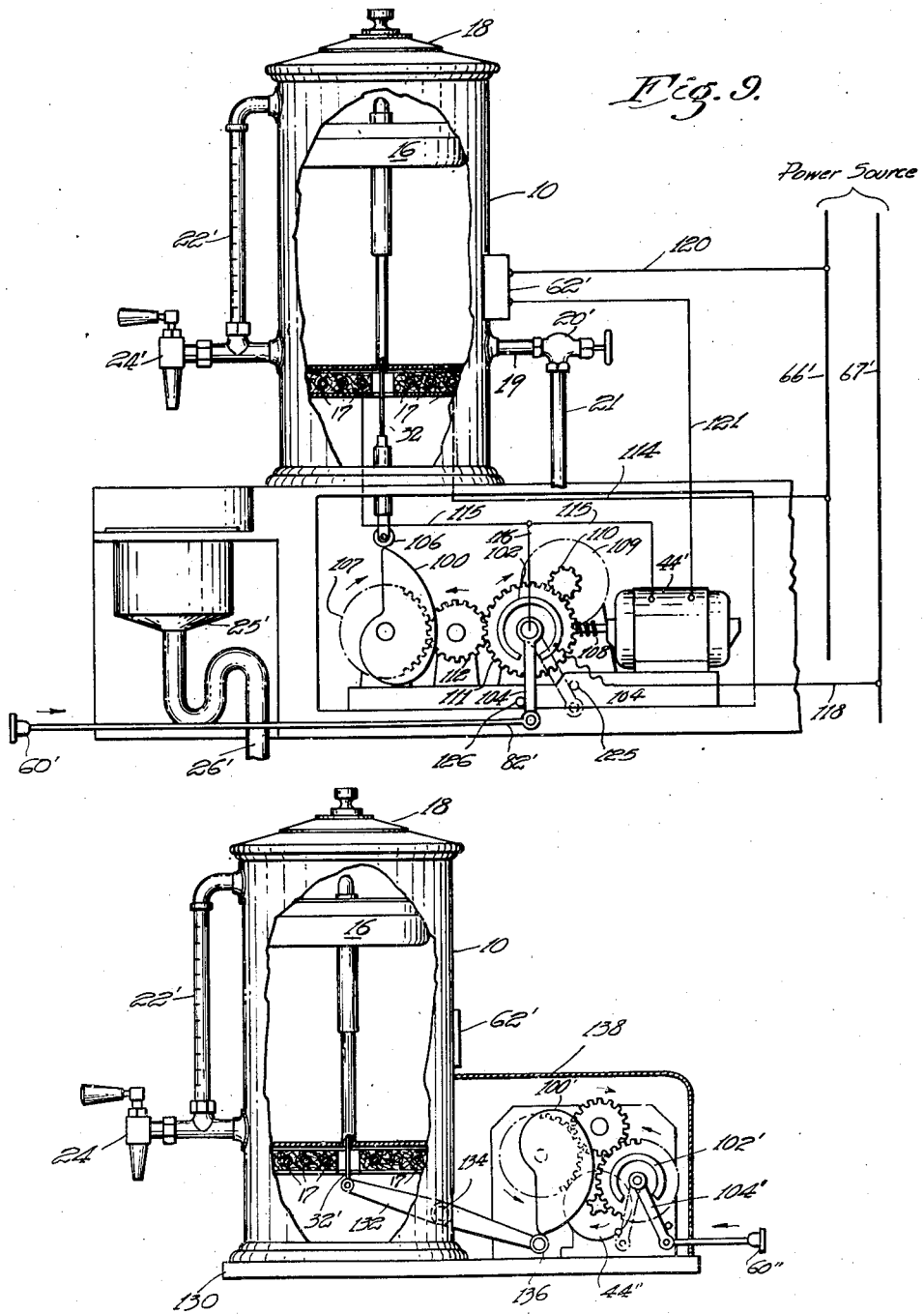

Patented Aug. 11, 1936

2,050,303

UNITED STATES PATENT OFFICE 2,050,303

COFFEE MAKER

Frank F. Forshee, Mansfield, Ohio, assignor to Westinghouse Electric & Manufacturing Company, East Pittsburgh, Pa., a corporation of Pennsylvania Application February 21, 1934, Serial No. 712,346

3 Claims. (Cl. 53—3)

My invention relates to coffee makers and has particular relation to apparatus for automatically making coffee by the so-called "drip" method.

It is generally recognized that the best coffee, particularly in point of flavor, can be made by submitting the coffee grounds to water that has previously been heated to a little below the boiling point, allowing them to remain therein for a relatively short predetermined time, and then entirely removing the grounds from the water. My invention is directed to equipment for automatically making coffee by the above-described method or process.

One object of my invention is to provide an automatic coffee making device which first heats the water to slightly below the boiling point and then submerges the coffee grounds therein.

Another object of my invention is to provide an apparatus of the type under consideration which limits the time of coffee submergement to the most effective predetermined value.

A further object of my invention is to provide an automatic coffee making machine which heats the water to a given temperature, submerges the coffee grounds therein, removes the grounds after the most effective given time, and then shuts down the entire equipment to effect a completion of the automatic cycle.

An additional object of my invention is to provide a coffee maker of the above-described type which requires only a few simple operations to place the water and coffee grounds into position for starting and in which the complete automatic cycle of operation may be initiated by a single control operation.

In one of its preferred forms, the improved coffee maker of my invention comprises an electrically heated container into which the water may be introduced, in quantity proper for the amount of coffee which is desired, and a tray or basket supported above the water level for receiving the coffee grounds in corresponding proper quantity. Actuation of a control lever starts the automatic cycle of operation by completing an energizing circuit for the heater. When the water temperature has risen to about 190° F., or other comparable value approaching the boiling point, a thermostat associated with the container completes a circuit for a small electric motor which drives suitable mechanism to lower the coffee tray into the water where it there remains for a time predetermined to be the most effective. At the expiration of this period, which may be of the order of four or five minutes, the motor driven mechanism withdraws the coffee basket from the water, thereby allowing any liquid remaining therein to drip out. Upon the completion of this withdrawal, the mechanism interrupts both the motor and the heater energizing circuits.

The coffee is now ready for consumption and may be withdrawn from the container in any suitable manner, as through the medium of a spigot provided near the container bottom. When made in this manner, coffee is found to have a flavor far superior to that which results from other methods.

My invention itself, together with additional objects and advantages thereof will best be understood through the following description of specific embodiments when taken in conjunction with the accompanying drawings, in which:

Figure 1 is a partially cut-away view in side elevation of a built-in or permanently-mounted type of coffee maker constructed in accordance with the teachings of my invention;

Fig. 2 is a top plan view of the device of Fig. 1, a portion of the removable cover and of the thermostat casing thereof also being cut away;

Fig. 3 is an enlarged view, partially in section, of the coffee basket supporting means comprised by the device of Figs. 1 and 2;

Fig. 9 is a partially cut-away view in side elevation of a coffee maker which utilizes a somewhat different form of basket actuating and circuit control mechanism; and Fig. 10 is a simplified representation of a portable type of coffee maker constructed in accordance with my invention.

Figure 4:
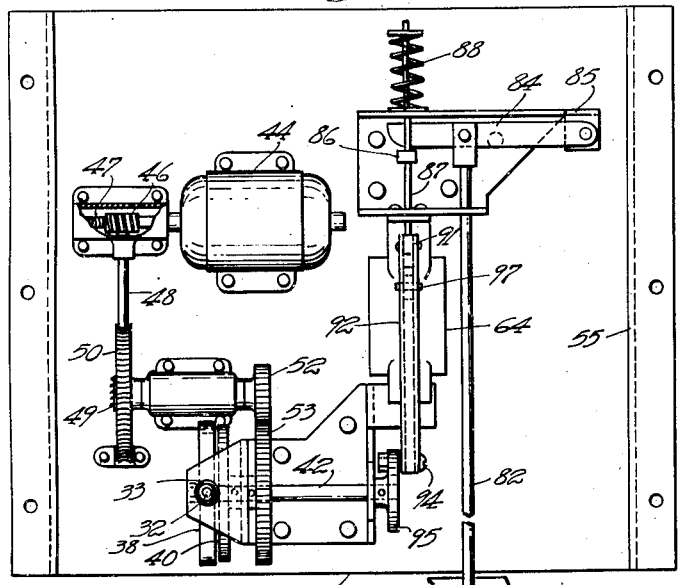
Fig. 4 is a top or plan view of the basket actuating mechanism comprised by the coffee maker of Figs. 1 and 2.
Figure 6:
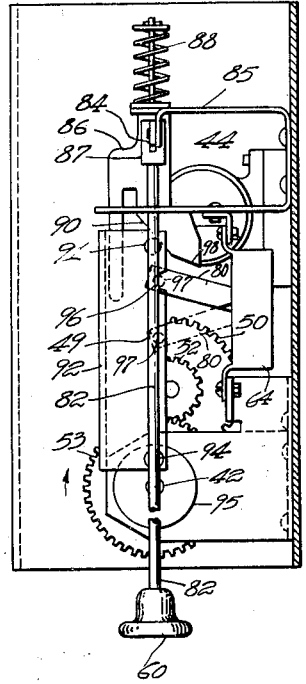
Fig. 6 is a view in side elevation of the mechanism of Figs. 4 and 5.
Figure 5:
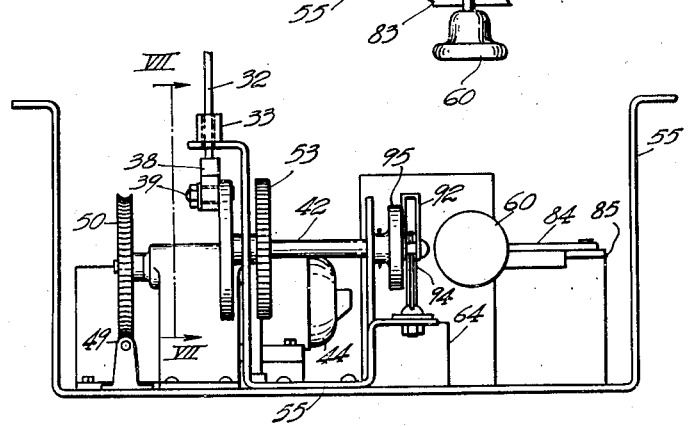
Fig. 5 is a view in end elevation of the mechanism of Fig. 4.
Figure 7:
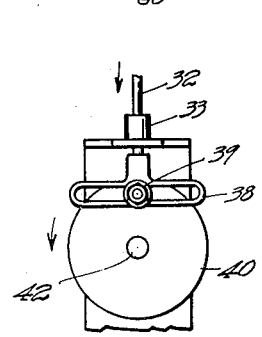
Fig. 7 is an end view of the basket raising and lowering crank assemblage taken on the line VII—VII of Fig. 5.

Referring to the drawings, and particularly to Figs. 1 and 2 thereof, the coffee maker there illustrated basically comprises a container 10 into which water may be introduced, a tray or basket 16 for receiving the ground coffee, an electric heater 17 for raising the water temperature, a control knob 60 for actuating a control switch 64 to initiate heater energization, coffee-basket lowering, raising, and timing mechanism 14 driven by a motor 44, a thermostat 62, sensitive to the water temperature, for initiating motor energization, and means for actuating the switch 64 to the open position to shut down the equipment upon completion of the automatic cycle.

In the built-in or stationarily-mounted coffee maker illustrated in Figs. 1 and 2, the container 10 is in the form of a metal-walled receptacle which is mounted upon the top of a table or shelf member 12 to the under surface of which the mechanism 14 is mounted and arranged through a lift rod 32 to effect a raising and lowering of the tray or coffee basket 16. Directly underneath the bottom wall 15 of the container is positioned the electric heater shown as comprising resistor elements 17 embedded in refractory material in well known manner. The container is provided with a removable cover 18, which allows access to the coffee-ground basket 16, and is adapted to be filled with water through an inlet connection 19 by the opening of a valve 20 which allows admission from a water supply line 21.

The level of the water thus introduced may be externally ascertained by reference to a graduated gauge 22 illustrated as comprising a glass tube into which the water rises. As shown, this gauge is affixed to an outlet connection for the container 10 which terminates in a spigot 24, the opening of which allows the liquid to be withdrawn and collected in a cup or other receptacle placed thereunder. Arranged underneath the spigot to collect excess or spilled liquid is a fixture 25 which is connected with a drain conduit 26.

In the particular arrangement shown, the lift rod 32, which normally supports the basket 16 above the liquid level, extends down through the bottom member 15 of the liquid container 10, and terminates, as is shown in Figs. 4 to 7, inclusive, in a yoke fixture 38 which embraces a crank pin 39 mounted near the periphery of a disc member 40 carried by a drive shaft 42. Rotation of the shaft 42 thus lowers and raises the rod 32, which rod is surrounded by a cooperating sleeve member 36 which, by extending above the highest desired liquid level, prevents liquid from leaking past the rod. The lift rod 32 is guided at its lower end by a sleeve member 33 through which it slides.

To drive this shaft 42 at the required slow rate of speed, which is of the general order of but one revolution in four or five minutes, during which period one complete cycle of basket lowering and raising is to be effected, the previously mentioned motor 44 is connected to the shaft through the medium of suitable reduction gearing. Such gearing may, as shown in Fig. 4, comprise a worm 46 mounted on the end of the motor shaft to mesh with a worm gear 47 which drives, through a shaft 48, a second worm 49 which meshes with a second worm gear 50. Mounted on the same shaft as gear 50 is a gear 52 which meshes with gear 53 to drive the main shaft 42. This, and other related mechanism, is all supported by the sheet metal tray member 55, which is suspended from the under side of the table or shelf member 12 before described.

The coffee basket 16, which is normally supported above the water level, comprises a lower or cuplike member 27 of sheet metal which is open at the top and into which a flat or disklike cover member 31 is adapted to fit. As is most clearly shown in Figs. 2 and 3, both the basket and cover are provided with perforations 35 of such fineness as to allow the water to enter the basket and intermingle with the coffee during submergence, but to prevent the grounds themselves from leaving the basket and entering the liquid in the main container 10.

As is most clearly shown in Fig. 3, the lower or cup portion 27 of the coffee basket is supported through spring members 28 which engage in grooves 29 in a graduated tube member 30, the closed top of which rests upon the upper end of the supporting or lift rod 32. In the illustrated coffee maker, the entire coffee basket assemblage 16 may, for charging or other purposes, be removed from the interior of container 10 by first taking off the cover 18 and then lifting the supporting tube 30 from its position over the lift rod 32 and its surrounding sheath 36.

When the device is in the non-operative condition shown, the basket 16 is supported above the level of the water which is admitted into the container 10 preparatory to making coffee. If, for example, it is desired that 20 cups be made, water admission is continued until the level gauge indicates that number. The coffee basket 16, into which a corresponding proper quantity of grounds have been introduced, is then positioned upon the graduated sleeve 30 so that the designation 20 shows above the top of the central sleeve member 34 of the basket. This insures that a proper submergence will result upon operation of the motor driven lowering mechanism 14.

Figure 8:
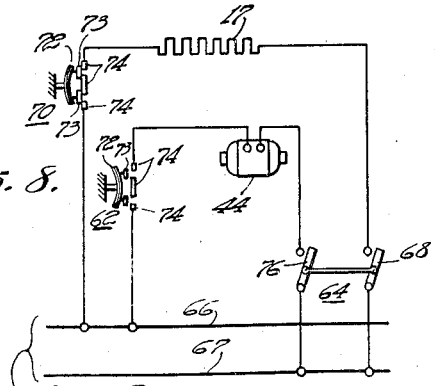
Fig. 8 is a diagrammatic representation of the electrical circuits embodied by the coffee maker illustrated in the preceding figures.

The electrical connections of the several elements of this coffee maker are indicated by the diagram of Fig. 8, in which a power source is designated by the circuit conductors 66 and 67. The before-mentioned operation control switch 64 is of the two-circuit variety, it being diagrammatically represented as comprising a blade 68, which, when actuated to the closed position, completes a circuit for energizing the container heater 17, and a second blade 76 which is connected in a circuit through which the motor 44 may be energized.

The represented heater circuit may be traced from power source conductor 66 through a protective thermostat 70, the heater 17, and switch blade 68, back to circuit conductor 67. The thermostat 70 is provided to protect the heater from damage by opening the circuit in case energization is effected when the container 10, upon the side of which the thermostat is mounted, has no liquid therein. In Fig. 8, it, as well as the thermostat 62, is diagrammatically represented as comprising a bimetal disk 72 which is rigidly supported at its center and which carries, near the periphery thereof, one set of contact members 73 which are adapted to cooperate with a second or stationary set of contact members 74.

The disk 72 of thermostat 70 is normally cupped in a direction to maintain the two sets of contacts in engagement. When the temperature of the wall of container 10, to which the disk is subjected, rises considerably above the boiling point of water, which temperature can only result when there is no water in the container, the disk snaps to the oppositely cupped position, thereby opening the heater circuit and preventing damage thereto. A subsequent cooling down of the container 10 causes the thermostat to snap back into the closed-circuit position illustrated.

The second represented blade 76 of switch 64 (Fig. 8) functions, when actuated to the closed position, to set up an energizing circuit for the motor 44, which circuit is completed only when the disk 72 of thermostat 62 is subjected to a temperature closely approaching the boiling point, or say 190° F. Under such a condition, the thermostat disk snaps to the cupped position which is opposite from that represented in Fig. 8, thereby actuating the contact members 73 into engagement with the stationary members 74. This completes the motor energizing circuit which, as represented, may be traced from the power source conductor 66, through the thermostat 62, the motor 44, and the blade 76 of switch 64 back to power source conductor 67.

As is shown most clearly in Fig. 2, the described thermostats 62 and 70 are mounted directly in contact with the wall of the container 10, a sheet metal casing 78 being utilized to cover these devices and to improve the appearance of the complete coffee maker. It will be apparent that insofar as the basic operations of my invention are concerned, only the thermostat 62 is essential, the second device 70 being included for the purpose of securing the protection already explained.

In placing the automatic coffee maker in operation, it is desired that operation of the control knob 60 shall actuate the switch 64 from the normally opened position illustrated to the closed position where it will be maintained until the automatic cycle is completed. One preferred manner of accomplishing this result is typified by the mechanism shown in Figs. 4 to 7, inclusive. The switch 64 utilized is provided with an extended operating lever 80, movement of which from one extreme position nearly to the opposite extreme is necessary to effect switch actuation. This particular characteristic may be attained through the utilization of a well known toggle mechanism (not shown) inside of the physical structure represented at 64 in Figs. 4 to 6, inclusive. Thus, to effect a closure of the switch contacts, it is necessary that the lever 80 be moved from the "off" position illustrated past center and very closely approaching the other extreme position shown dotted in Fig. 6. A similar requirement obtains for opening the switch contacts by moving the lever 80 from the "on" position shown dotted to the "off" position shown in full lines.

The coffee maker control knob 60 is mounted on the end of a rod 82, the front end of which is slidably mounted in a hole in the stationary front member 83 of the table or cabinet structure and the rear end of which is pivotally mounted to an arm 84, one end of which is pivoted to a stationary angle piece 85 carried by the structure 55. A pulling forward of the rod 82 causes the other end of arm 84 to contact a collar 86 carried by a second member 87, which is normally biased in the rear position shown by means of a compression spring 88. The front end of member 87 comprises an inclined surface 90, which, when pulled forward, as by the control knob 60, bears against a roller 91, carried by a cooperating member 92, the front end of which member is pivotally mounted on a crank pin 94 carried by a second disc 95 which is mounted on the main shaft 42 before mentioned as actuating the coffee basket lifting equipment.

When so pulled forward, the member 90 thus lifts the rear portion of member 92, thereby releasing a slot 96 therein from its normal engagement with a pin 97, carried by the switch actuating lever 80. This releasing having been effected, further movement of the member 87 in the forward direction brings projection 98 into engagement with the switch lever and actuates it to the forward or "on" position shown by the dotted lines of Fig. 6. Because of the before explained characteristics of the switch 64, it remains in this "on" position after the forward pressure on the control knob 60 has been released and thereby maintains the container heater 17 energized.

Upon the actuation of thermostat 62, which as before explained results when the water within the container 10 has been heated to a temperature which closely approaches the boiling point, motor 44 starts and slowly rotates the shaft 42 thereby gradually lowering the coffee tray 16 into the water container and also drawing the mechanical member 92 forward as a result of the movement of crank pin 94 around and toward the opposite side of the main drive shaft 42. As rotation of shaft 42 continues, and the pin 94 reaches the opposite side or the front of disc 95 relative to shaft 42, the before-mentioned slot 96 in member 92 is advanced to the position of switch lever pin 97 over which the weight of the member 92 causes it to drop.

Further rotation of the shaft 42 simultaneously starts to lift the coffee basket 16 out of the water and return the member 92 toward the rear position. Such a return gradually moves the switch arm 80 towards the "off" position, and when this is nearly reached, at which time the coffee basket 16 has been completely removed from the water, the internal mechanism of switch 64 actuates the contact members from the engaged to the disengaged position, thereby interrupting both the motor and heater supply circuits. The cycle of automatic operation is completed by this action.

The characteristics of the thermostat 62 are such that when the temperature to which it is subjected has dropped considerably below its actuating value, the disc 72 thereof will snap back to the cupped position shown in Fig. 8, thereby opening at this point the motor circuit and placing the equipment in readiness for another operation.

One construction of the improved coffee making apparatus of my invention having been described, attention may now be directed to the sequence of operations necessary to make coffee by its use. The first operation is to admit into the container 10 through valve 20 a quantity of water proper for the number of cups of coffee which it is desired to make. This quantity is indicated by the gauge 22. The second operation is to remove the container cover 18 and lift the cover 31 from the basket 16 and introduce therein a quantity of coffee grounds appropriate for the selected number of cups. In practice, it has been found that two teaspoonfuls of grounds per cup are proper. The cover 31 is then replaced on the basket which is then adjusted along the length of the graduated tube 30 until the selected number of cups appears on the scale above the tray assemblage. This adjustment having been made, the charged basket 16, assuming it to have been removed to facilitate scale adjustment, is replaced within the container 10, the basket being under these conditions supported slightly above the level of the water therein, and the cover 18 is placed on the container.

The preparatory operations now having been completed, it only remains for the operator to pull forward the control knob 60 which operation, as has been before pointed out, effects a closure of the switch 64, which closure completes an energizing circuit for the container heater 17 and sets up a circuit for the motor 44. The switch 64 having been closed, a release of the control knob 60 allows spring 88 to withdraw it to the normal position illustrated. Under the action of the heater 17, the temperature of the water within the container 10 rises and when it has approached the boiling point, the thermostat 62, which for all lower temperatures maintains its contacts in the disengaged position, actuates these contacts to the engaged position, thereby completing the motor circuit.

The resulting motor rotation drives through the reduction gearing explained, the main shaft 42, and thereby rotates the crank pin 39 from the extreme upward position illustrated toward the lower portion. Such rotation moves the yoke 38, to which the lower end of the basket supporting rod is affixed, downwardly to effect a submergement in the water of the coffee tray 16. In penetrating the perforations 35 in the tray walls, the hot water mingles with the coffee grounds and absorbs flavor therefrom. Such a mingling continues for any desired period which may be selected, which period, preferably of the order of several minutes, may be varied by adjusting the motor speed or by changing the constants of the reduction gearing. During this time the crank pin 39 has moved to the extreme lower position and the crank pin 94 has moved to the front position to allow member 92 to engage the actuating arm 80 of the switch 64.

Further movement of the shaft starts to lift the tray 16 upwardly and to advance the switch blade 80 toward the rear or "off" position. When, as before mentioned, the tray has been completely withdrawn, and the member 92 has closely approached its extreme rear position, the switch 64 functions to actuate the contact members thereof to the disengaged position, thereby interrupting both the heater and the motor circuits and completely discontinuing further automatic operations.

The coffee making operation now being complete, the product may be withdrawn from the spigot 24 into cups or other receptacles. It will be recognized that the thermal capacity of this equipment is such that the heat stored in the container walls and other parts will be sufficient to keep the coffee warm for a considerable period of time. The container 10 having been emptied of its charge of coffee, a washing out thereof may be effected by opening the valve 20 and at least partially filling the container and then drawing off this rinse solution by opening the spigot 24.

In Fig. 9 I have illustrated a second embodiment of my invention, also in the form of a stationarily mounted or built-in device. For purposes of explanation, it may be assumed that the main container 10, the coffee tray 16, and the heater 17 are identical with those elements which have already been described. In the device of Fig. 9, a water inlet valve 20', a water level gauge 22' and an outlet spigot 24' are also illustrated, together with a cooperating drain fitting 25'. The difference in this embodiment over the one just described, chiefly resides in the substitution for the yoke and crank pin arrangement of a cam 100 for changing the elevation of the coffee basket 16 and for the double-pole toggle-actuated switch of a rotary-type contact-making device, comprising a segment 102 and a cooperating contact lever 104, for controlling the device energizing circuits.

The cam 100 bears against a roller 106 carried by a fitting attached to the lower end of the basket supporting rod 32 and is driven by means of a gear wheel 107 which is rotated at a greatly reduced speed by a motor 44' through reduction and other gearing comprising a worm gear 108 and cooperating spur gears 109 to 112, inclusive. A source of power for the motor and heater is designated by circuit conductors 66' and 67', and a liquid temperature responsive thermostat 62' is connected in the motor supply circuit.

In operation of this embodiment of my invention, the container 10 having been properly filled with water and the requisite amount of coffee grounds introduced into the coffee basket 16, the apparatus is placed in operation by depressing the control knob 60' which, through rod 82', moves contact lever 104 from the position shown, in which it is out of engagement with the rotatable segment 102, rearwardly to the position indicated by the dotted lines in which it engages one end of the segment which is carried by gear wheel 111, which gear wheel is arranged to rotate at exactly the same speed as does the cam carrying gear wheel 107.

This completes an energizing circuit for the heater 17 which may be traced from power source conductor 66' through conductor 114, the heater 17, conductors 115 and 116, the contact arm 104, the rotatable segment 102, and conductor 118, back to the power source conductor 67'. Through the medium of well known means, details of which are not shown, segment 102 is at all times connected with conductor 118 mentioned. Thus energized, the heater raises the temperature of the water within the container 10 and when the boiling point is approached, the thermostat 62', which may be similar to the devices before described in detail, actuates its contact members to the closed circuit position, thereby completing an energizing circuit for the motor 44' which circuit may be traced from the power source conductor 66' through conductor 120, the thermostat 62', conductor 121, the motor 44', conductors 115 and 116, the contact arm 104, the rotatable segment 102, and conductor 118 back to the power source conductor 67'.

Thus energized, the motor rotates the several gear wheels in the directions indicated by the arrows. One effect of such rotation is to cause the cam 100 to allow the roller 106 to drop down to the lowest position, thereby submerging the coffee tray 16. As a second effect, the rotatable segment 102 in moving in the clockwise direction, carries with it the contact making arm 104, thereby shifting this arm from the extreme rear position, limited by a stop member 125, to the extreme forward or normal position, limited by a second stop member 126. When the arm 104 is pushed up against the stop 126, the segment 102, in further rotating, slides with reference to the cooperating arm, but at all times maintains electrical contact therewith and thus continues to supply energizing current to the heater 17 and the motor 44'.

Rotation of the cam 100 and the contact segment 102 continues until each has revolved through nearly one full revolution at which time the coffee tray 16 has been raised from its submergement in the water and the segment 102 has slid its full circumferential length underneath the blocked arm 104 and separated contact therefrom. At this instant, the motor and heater energizing circuit are both broken and further operation of the mechanism is accordingly discontinued.

A third embodiment of my invention is illustrated in Fig. 10 in the form of an automatic coffee maker designed to be portable. Instead of mounting the liquid container 10 upon a tabletop or other stationary surface, it is positioned upon a base 130 upon an extension of which the motor driven circuit controlling and coffee basket actuating mechanism is secured. In the drawings, this mechanism has been diagrammatically indicated as equivalent to that shown and described in connection with Fig. 9, it comprising a cam 100' driven by a motor 44" through a train of gears on one of which is mounted a rotatable contact segment 102' which cooperates with a contact making arm 104', which may be actuated to the contacting position by a depression of the control knob 60".

The lower end of the tray supporting rod 32' is fixed to one end of a lever 132 pivoted at 134 and carrying at the opposite end thereof a roller 136 which cooperates with the cam member 100' in a manner exactly comparable to that previously explained for the mechanism for Fig. 9. Also mounted on the side of the container 10 is the thermostat 62' which is connected in the motor circuit. A protective casing 138 is shown as being positioned over the mechanism just described.

While in each of the illustrated embodiments of my invention, the coffee tray is interconnected with the actuating mechanism therefor through the medium of a rod extending down through the bottom of the liquid container, it will be apparent that if desired, the basket may instead be supported from the top of the container through means adapted to interconnect mechanically with actuating mechanism which may be mounted in any convenient location as upon one of the container sides. The important feature of my invention is the provision of an apparatus for making coffee by the drip method which functions to automatically bring the water up to a given temperature, immerse the coffee grounds therein for a predetermined time, and then remove them and completely shut down the mechanism.

Although I have shown and described certain specific embodiments of my invention, I am fully aware that many modifications thereof are possible. My invention therefore is not to be restricted except insofar as is necessitated by the prior art and by the scope of the appended claims.

I claim as my invention:

1. Coffee-making apparatus comprising a container adapted to receive water, a perforated tray, adapted to receive coffee grounds, supported within the container above the water level, an electric heater associated with the container, mechanism for lowering said tray into the water, retaining it there for a given time, and then withdrawing it, a motor for driving said mechanism, a source of power for said heater and motor, manually operable control means for completing an energizing circuit for the heater, a thermostat associated with said container for completing an energizing circuit for said motor when the water within the container attains a given high temperature, and means for deenergizing both the heater and the motor when said mechanism has been advanced through one complete cycle of operation.

2. A coffee maker comprising in combination a container adapted to receive water, an electric heater therefor, a basket, adapted to receive coffee grounds, supported within the container, mechanism for lowering the basket into the water and then withdrawing it after a given time, a motor for driving said mechanism, switching means adapted, upon manual actuation to the closed-circuit position to effect a heater energizing connection and to set up an energizing circuit for the motor, a thermostat adapted to complete said motor circuit when the water temperature rises above a given value, and means for actuating said switching means to the open-circuit position when the said basket-actuating mechanism has been advanced through a complete cycle of operation.

3. Coffee-making apparatus comprising a container adapted to receive water, a perforated tray, adapted to receive coffee grounds, supported within the container above the water level, an electric heater associated with the container, mechanism for lowering said tray into the water, retaining it there for a given time, and then withdrawing it, a motor for driving said mechanism, manually-operable control means for effecting a heater-energizing connection, a thermostat associated with said container for effecting a motor-energizing connection when the water within the container attains a given temperature, and means for effecting a deenergization of both the heater and the motor when said mechanism has been advanced through one complete cycle of operation.

FRANK F. FORSHEE.